(12) United States Patent
Walpurgis (10) Patent No.: US 9,774,019 B2
(45) Date of Patent: Sep. 26, 2017

(54) RECHARGEABLE BATTERY UNIT FOR A WATERCRAFT

(71) Applicant: CAYAGO GMBH, Kitzbühel (AT)

(72) Inventor: Hans Peter Walpurgis, Ellmau (AT)

(73) Assignee: Cayago GmbH (AT)

( * ) Notice: Subject to any disclaimer, the term of this patent is extended or adjusted under 35 U.S.C. 154(b) by 0 days.

(21) Appl. No.: 14/761,246

(22) PCT Filed: Dec. 23, 2013

(86) PCT No.: PCT/EP2013/077897
§ 371 (c)(1),
(2) Date: Jul. 15, 2015

(87) PCT Pub. No.: WO2014/111233
PCT Pub. Date: Jul. 24, 2014

(65) Prior Publication Data
US 2015/0340672 A1 Nov. 26, 2015

(30) Foreign Application Priority Data

Jan. 18, 2013 (DE) .................. 10 2013 100 545

(51) Int. Cl.
*H01M 2/00* (2006.01)
*H01M 2/10* (2006.01)
(Continued)

(52) U.S. Cl.
CPC ....... *H01M 2/1077* (2013.01); *H01M 2/1083* (2013.01); *H01M 2/206* (2013.01);
(Continued)

(58) Field of Classification Search
CPC ......... H01M 10/0422; H01M 10/0481; H01M 2220/20; H01M 2/1077; H01M 2/1083; H01M 2/206
See application file for complete search history.

(56) References Cited

U.S. PATENT DOCUMENTS

| 5,227,263 A | 7/1993 | Blier |
| 2013/0034758 A1 | 2/2013 | Raedsch et al. |

FOREIGN PATENT DOCUMENTS

| DE | 10 2005 001 817 B4 | 1/2009 |
| DE | 10 2004 049 615 B4 | 3/2009 |

(Continued)

OTHER PUBLICATIONS

International Search Report for PCT/EP2013/077897 (in English and German), dated Feb. 28, 2014; ISA/EP.

*Primary Examiner* — Patrick Ryan
*Assistant Examiner* — Ben Lewis
(74) *Attorney, Agent, or Firm* — Lucian Wayne Beavers; Garrett M. Hausman; Patterson Intellectual Property Law, PC (57) ABSTRACT

The invention relates to a rechargeable battery unit, in particular for a watercraft, having a plurality of rechargeable batteries which are connected to one another by means of a holding arrangement to form a rechargeable battery cell, wherein the holding arrangement has at least one holder which forms receptacles by means of which the rechargeable batteries are held in the region of a pole end, and that at least some of the rechargeable batteries are electrically coupled to one another in the region of their poles by means of a pole connector. A design of this kind allows a powerful rechargeable battery unit to be constructed with a compact installation space, it also being possible for the rechargeable battery cells to be cascaded for the purpose of varying the energy density and/or voltage in said rechargeable battery unit. A rechargeable battery unit of this kind is suitable, in particular, for use in motor-operated watercraft.

14 Claims, 5 Drawing Sheets

(51) Int. Cl.
*H01M 2/20* (2006.01)
*H01M 10/04* (2006.01)

(52) U.S. Cl.
CPC .... *H01M 10/0422* (2013.01); *H01M 10/0481* (2013.01); *H01M 2220/20* (2013.01)

(56) References Cited

FOREIGN PATENT DOCUMENTS

DE    10 2011 102 102 A1    11/2012
EP            2 343 752 A2    7/2011
JP         EP 2343752 A2 *    7/2011    .............. H01M 2/10

\* cited by examiner

RECHARGEABLE BATTERY UNIT FOR A WATERCRAFT

CROSS REFERENCE TO RELATED APPLICATIONS

This application is a U.S. National Phase Application under 35 U.S.C. 371 of International Application No. PCT/EP2013/077897 filed on Dec. 23, 2013 and published in German as WO 2014/111233 on Jul. 24, 2014. This application is based on and claims the benefit of priority from German Patent Application No. 10 2013 100 545.4, filed on Jan. 18, 2013. The entire disclosures of all of the above applications are incorporated herein by reference.

The invention relates to a rechargeable battery unit for a watercraft, having a plurality of rechargeable batteries which are connected to one another by means of a holder arrangement to form a rechargeable battery cell, and which are electrically coupled to one another by means of pole connectors.

DE 10 2004 049 615 B4 discloses a watercraft which forms a flow channel in a vehicle hull and in which an electric motor is arranged. The electric motor drives a propeller by means of a drive shaft. The propeller draws the water through an intake opening in the flow channel, accelerates said water and expels said water at the rear in the rear region of the hull, so that jet propulsion is formed. The motor is supplied with power by a rechargeable battery unit. The hull of the watercraft is formed such that a user can be supported on it, at least partially, by way of his upper body. Watercraft of this kind are suitable both for traveling on the water surface and underwater and can therefore be used as a diving sled.

DE 10 2005 001 817 B4 discloses a control electronics system with which the electrical components of a watercraft can be driven by means of a bus system. In particular, the rechargeable battery unit is also connected to this bus system.

On account of the limited space in the hull, it is necessary to use components which are as small as possible in watercraft of this kind. In addition, these units should then also have a low inherent weight, this making it easier to transport the watercraft when it is not in the water. The rechargeable battery units are intended to provide a high power density with a sufficient voltage in as small an installation space as possible, in order to be able to generate high motor powers.

The object of the invention is to provide a rechargeable battery unit of the kind mentioned in the introductory part with which compact positioning and interconnection of a plurality of individual rechargeable batteries is possible.

This object is achieved by a rechargeable battery unit as claimed in claim 1.

According to the invention, the rechargeable battery unit has a plurality of rechargeable batteries which are connected to one another by means of a holder arrangement to form a rechargeable battery cell and which are electrically connected to one another by means of pole connectors. The holder arrangement has at least one holder which forms receptacles by means of which the rechargeable batteries are held in the region of a pole end.

The rechargeable batteries can be combined in a compact manner in the holding arrangement and form a rechargeable battery cell which can be handled in a standardized manner. Said rechargeable battery cell can be combined with further, in particular physically identical, rechargeable battery cells, wherein the power density and/or the voltage which is provided by the cell arrangement can be varied depending on the way in which the rechargeable batteries are interconnected.

The arrangement according to the invention further provides the option of varying the power density, by virtue of fitting the receptacles of the holders in a variable manner.

According to one preferred variant of the invention, it may be provided that at least two groups of rechargeable batteries are formed in one rechargeable battery cell, said groups each being connected to one another in parallel by means of the pole connectors.

According to the invention, a rechargeable battery unit is particularly preferably characterized in that the holding arrangement has two holders which, by way of their receptacles, each receive the opposite poles of the individual rechargeable batteries. In this way, the poles are combined in the region of the holders and simple electrical interconnection of the poles of the individual rechargeable batteries is possible.

A particularly simple design results when it is provided that the receptacles are in the form of plug receptacles into which the ends of the cylindrical housings of the rechargeable batteries are inserted. In this case, standardized rechargeable batteries which can be obtained at low cost can also be installed in particular.

According to one possible refinement of the invention, it can be provided that the holder has recesses or passages which provide access to the poles of the rechargeable batteries.

As mentioned above, two or more rechargeable battery cells can be lined up with one another and electrically coupled to one another. In this case, it has proven advantageous when the holder is equipped with alignment elements by means of which two holders, which are situated one against the other, of two rechargeable battery cells are aligned in relation to one another, in particular are secured in relation to one another in one direction in an interlocking manner. In this way, the individual rechargeable battery cells can be associated with one another in a positionally secure and stable manner.

In the case of an arrangement of a plurality of rechargeable battery cells which are lined up with one another, the adjacent rechargeable battery cells can be electrically interconnected in a simple manner by the pole connectors having contacts which are routed out of the region in which two rechargeable battery cells are lined up with one another. The contacts can then be locked to one another at the sides by means of suitable electrical connections.

It is particularly preferably provided that the groups of rechargeable batteries of one rechargeable battery cell are connected electrically in series to the groups of rechargeable batteries of the lined-up second rechargeable battery cell. As a result, the voltage can increase in a cascaded manner.

When it is provided that the poles of at least some of the rechargeable batteries are aligned in a single connection plane, simple component can be used for the electrical connection of the poles.

A particularly preferred refinement of the invention is that two or more rechargeable battery cells which are lined up with one another are inserted into a pipe section, and that the pipe section are closed at its ends by means of a closure piece and a cover. The rechargeable battery cells are accommodated in a protected manner and are protected against mechanical damage in the pipe section. In addition, a construction of this kind can be sealed off in a simple manner. To this end, the cover has to be sealed at one end of the pipe section and the closure piece has to be sealed at the other end by means of suitable seals, in particular at a wall section of the pipe section.

It has proven particularly advantageous when a cylindrical pipe is used as the pipe section, it being possible for annular seals which provide a high level of sealing to be used in this case. The use of a pipe section provides a high degree of pressure stability, and therefore this construction is particularly suitable for use in watercraft.

Simple construction is given for a rechargeable battery unit of this kind when it is provided that the closure piece and the cover are connected to one another by means of a tensioning element which runs in the interior of the pipe section. This design also permits simple servicing. To this end, it is only necessary to release the tensioning element. The cover or the closure piece can then be removed and the rechargeable battery cells can be withdrawn from the pipe section.

When the rechargeable battery unit is designed such that the cover has two pole connections which are accessible from the outside, and that the row of rechargeable battery cells forms a positive pole and a negative pole in the region of the cover, said positive pole and negative pole being electrically connected to the pole connections, a low level of wiring complexity is produced within the rechargeable battery unit and contact can be made with the outside of the rechargeable battery unit in a simple manner in the region of one end of the rechargeable battery unit.

When it is provided that the cover forms a receiving space in which a control circuit for the rechargeable battery cells is arranged, a fully functional rechargeable battery unit is produced. The control circuit is accommodated in the protected region between the pipe section and the cover. The control circuit is then accommodated in a secured manner, in particular against mechanical stresses.

The invention will be explained in greater detail below with reference to an exemplary embodiment which is illustrated in the drawings, in which.

Figure 1:
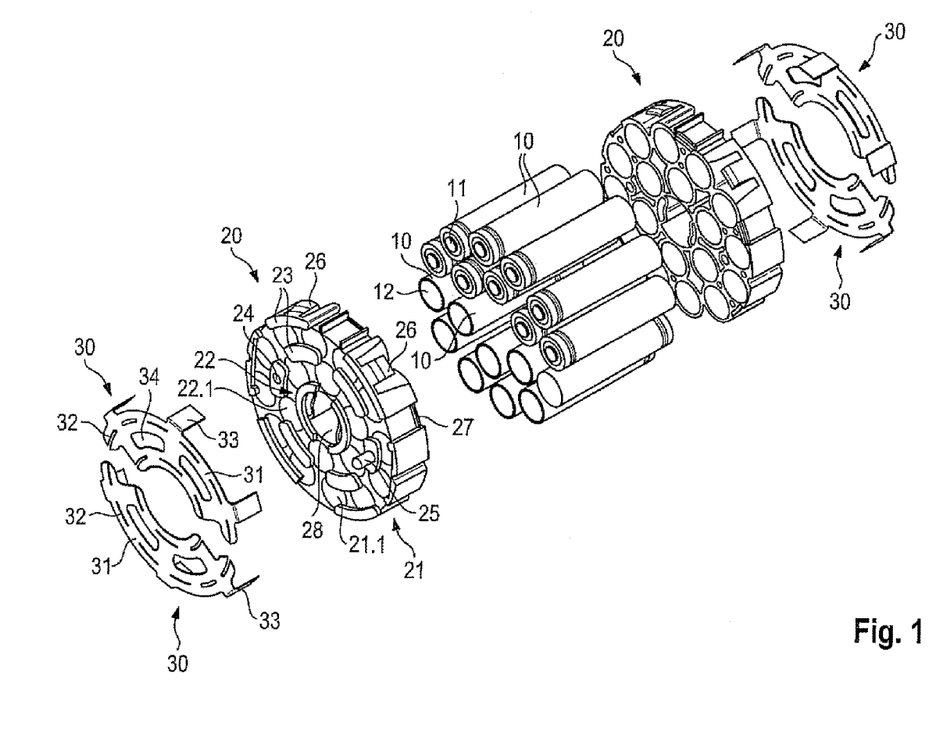
FIG. 1 shows an exploded and perspective view of a rechargeable battery cell.

FIG. 1 shows a rechargeable battery cell Z which has a plurality of rechargeable batteries 10. The rechargeable batteries 10 have a cylindrical housing and form a positive pole 11 and a negative pole 12 at their opposite longitudinal sides. As shown in FIG. 1, the rechargeable batteries 10 are arranged in such a way that two groups of rechargeable batteries 10 are formed, wherein nine rechargeable batteries are oriented with the positive pole 11 on the left and the negative pole on the right. The other nine rechargeable batteries 10 are each arranged in a manner rotated through 180° in relation to the first group of rechargeable batteries 10. They therefore have their negative pole 12 on the left-hand side and their positive pole 11 on the right-hand side. The rechargeable battery cell Z comprises two holders 20 which are of identical design for the purpose of reducing the expenditure on parts. Each holder 20 has two receptacle structures 21, 22 which each form a plurality of receptacles 21.1 and 22.1. In this case, the receptacles 21.1 and 22.1 are arranged in concentric rings of the holder 20. Each ring of receptacles 21.1 and 22.1 forms a receptacle structure 21, 22. The receptacles 21.1, 22.1 are designed as apertures, wherein the inner walls of the apertures are formed so as to match the outer contour of the rechargeable batteries 10. Therefore, the rechargeable batteries 10 can be inserted into the receptacles 21.1, 22.1 by way of their pole-side ends. The insertion movement is limited by means of integrally formed stops. In the present exemplary embodiment, the stops are formed by spacers 23. In the assembled state, the pole ends of the rechargeable batteries 10 lie on a common connection plane aligned in a uniform manner. After the accumulators 10 are inserted into the receptacles 21.1, 22.1 of the opposite holders, electrically conductive pole connectors 30 are installed with the holders 20. The pole connectors 30, which are in the form of conductive metal sheets, form a connecting section 31 which is equipped with contact regions 32 for making contact with the poles 11, 12 of the rechargeable batteries 10. The pole connectors 30 are formed with bent contacts 33 at the sides, said bent contacts being in the form of lugs. The pole connectors 30 can be mounted on the outside of the holder 20. In this case, the spacers 23 pass through apertures 34 in the pole connectors 30, so that said pole connectors can be easily aligned. The contacts 33 project into lateral contact receptacles 27 in the holders 20. In order to connect the pole connectors 30 to the rechargeable batteries 10, welded connections are produced in the region of the contact sections 32 which establish an electrically conductive connection between the poles 11, 12 and the pole connector 30. In each case two pole connectors 30 are provided for each group of rechargeable batteries 10, wherein the pole connectors 30 combine the positive poles 11 and, respectively, the negative poles 12 of the group of rechargeable batteries.

FIG. 1 shows a fully populated rechargeable battery cell Z, that is to say all of the receptacles 21.1, 22.1 are occupied by rechargeable batteries 10. When a variation in the energy density is desired, said rechargeable battery cell can also be partially populated. By way of example, the rechargeable batteries 10 of the receptacle structure 22 which forms the inner ring can be removed.

Figure 2:
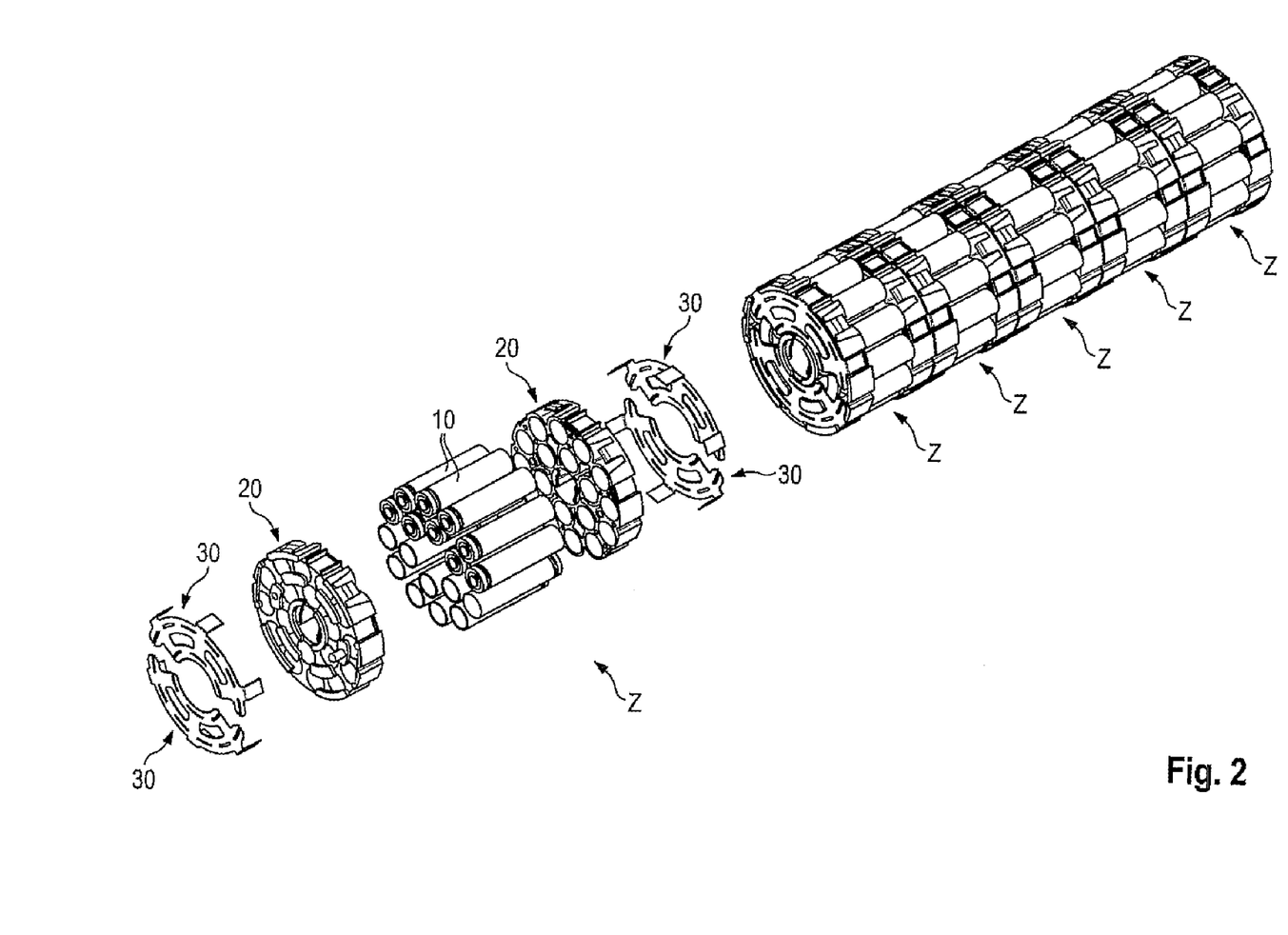
FIG. 2 shows a partially exploded, perspective illustration of a row of rechargeable battery cells.

As shown in FIG. 2, a plurality of physically identical rechargeable battery cells Z can be lined up in a cascaded manner. To this end, the holders 20 are provided with alignment elements 24, 25. In the present exemplary embodiment, the alignment elements 24, 25 are in the form of a hole (alignment element 24) and in the form of a pin (alignment element 25). In this case, the geometry of the pin is matched to the contour of the hole. Therefore, the alignment elements 24, 25 of the physically identical holders 20 of adjacent rechargeable battery cells Z engage one in the other and align the rechargeable battery cells in an exact manner in relation to one another. The alignment elements 24, 25 additionally form an interlocking connection in the circumferential direction, and therefore the rechargeable battery cells cannot be rotated in relation to one another.

Figure 3:
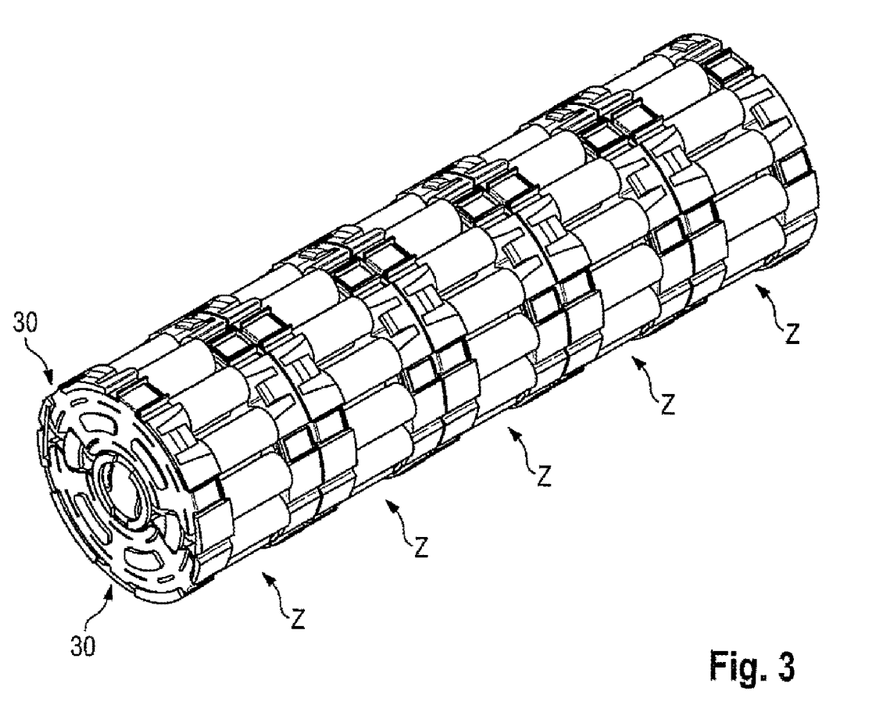
FIG. 3 shows the row of rechargeable battery cells according to FIG. 2 in assembled form.

FIG. 3 shows an illustration of six rechargeable battery cells Z in the assembled state in order to form a compact physical unit.

Figure 4:
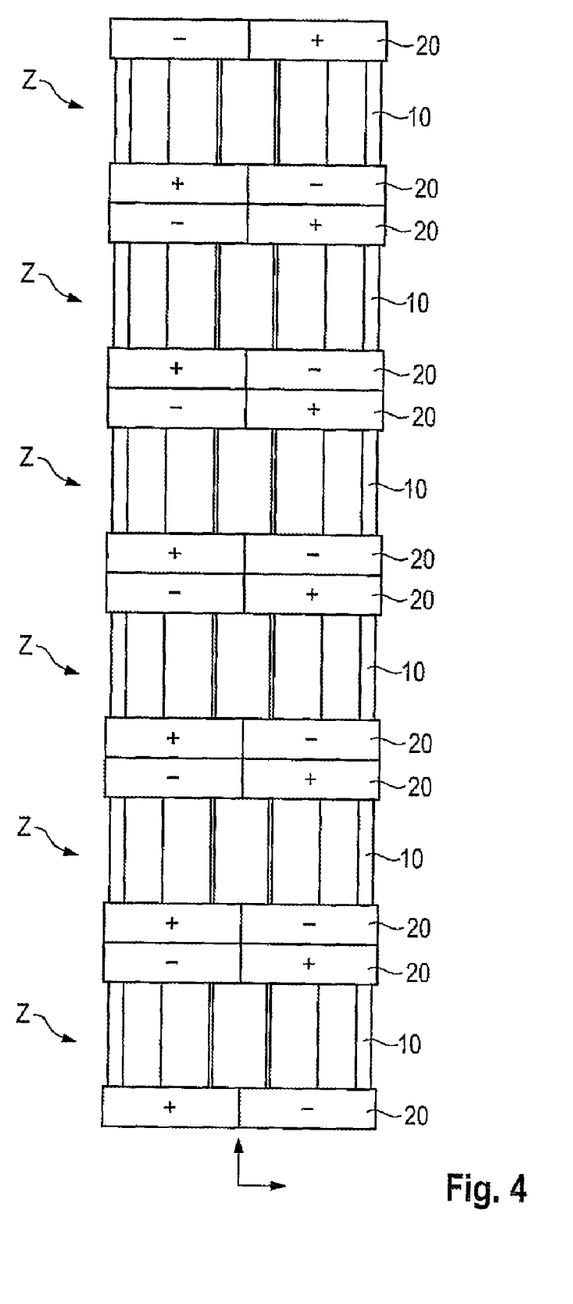
FIG. 4 shows a schematic diagram of a side view of the row of rechargeable battery cells according to FIGS. 2 and 3.

FIG. 4 shows the pole assignment of the individual rechargeable battery cells Z in relation to one another. As shown in said illustration, the alignment of the first group of rechargeable batteries (nine rechargeable batteries) in the upper rechargeable battery cell Z is selected in such a way that the negative pole 12 is arranged at the top and the positive pole 11 is arranged at the bottom. The right-hand side group of rechargeable batteries 10 of the upper rechargeable battery cell Z is arranged such that the positive poles 11 are arranged at the top and the negative poles 12 are arranged at the bottom. The pole structure of the rechargeable battery cell Z which adjoins the upper rechargeable battery cell Z is reversed in relation to the pole structure of the rechargeable battery cell which is situated above it. The further rechargeable battery cells join one another in a corresponding manner, as is illustrated by the positive and negative pole signs in FIG. 4.

The lower rechargeable battery cell forms the positive pole on the left-hand side and the negative pole on the right-hand side at the bottom. A special pole connector which connects all of the poles (positive poles 11 and negative poles 12) of the rechargeable battery cell Z to one another is provided here. Current flow in the numerical order 1 to 12 used in FIG. 4 is achieved in this way. Therefore, two groups of rechargeable batteries 10 which are connected in parallel are used in each rechargeable battery cell Z, said groups providing a high power density. On account of the association of the pole structures of the individual rechargeable battery cells Z, the voltage of a rechargeable battery 10 increases twelvefold as a result of the cascaded series connection. This cascaded connection therefore permits a low installation height for the rechargeable battery unit. It is particularly advantageous when an even number of rechargeable battery cells Z is installed. The positive pole and the negative pole of the combination of rechargeable battery cells are then arranged in the region of one end of the unit, as is symbolized by way of the positive pole and the negative pole at the top in FIG. 4. Therefore, a uniform connection region is formed here.

Figure 5:
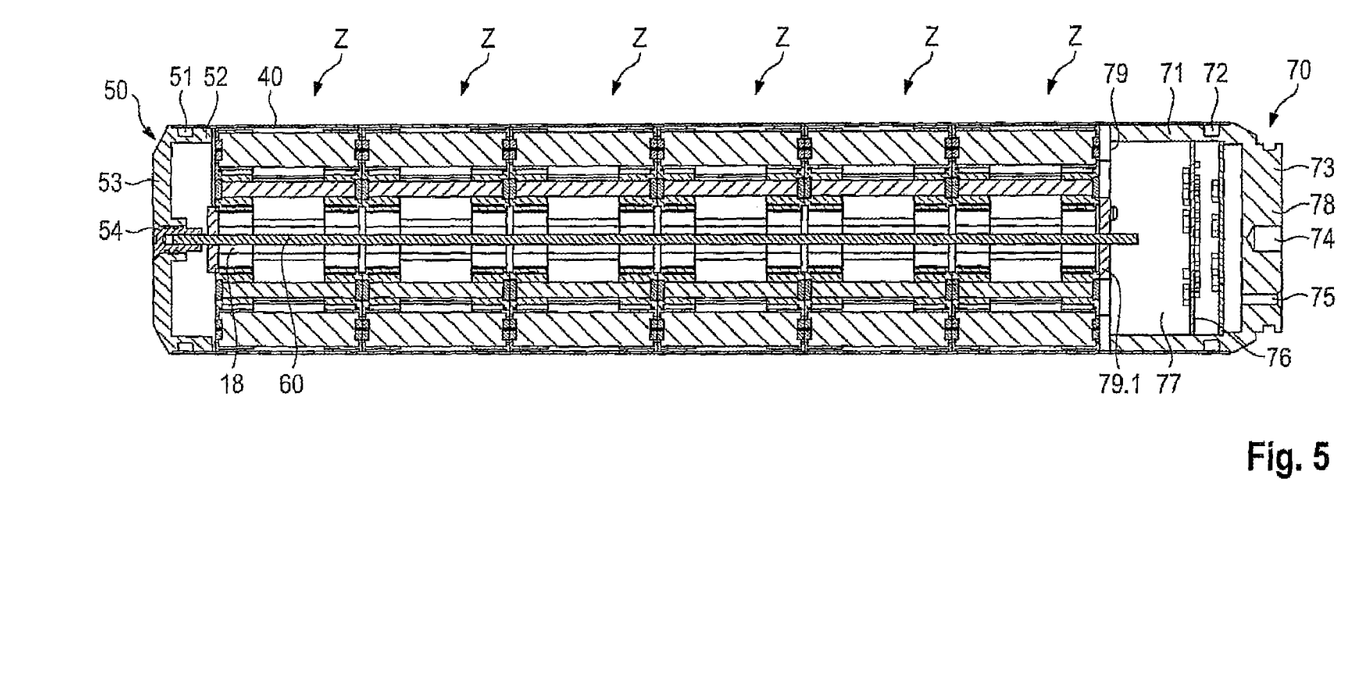
FIG. 5 shows a sectional side view of a rechargeable battery unit.

The arrangement shown in FIG. 3 can be inserted into a pipe section, as is illustrated in FIG. 5. In this case, the pipe section 40 is preferably in the form of a thin-walled cylindrical pipe. After the rechargeable battery cells Z have been inserted into the pipe section 40, said pipe section can be closed by a closure piece 50 and a cover 70. The closure piece 50 has a bottom 53 which has a plug attachment 52 integrally formed on it. In this case, the outer contour of the plug attachment 52 is designed to match to the inner contour of the pipe section 40. The plug attachment 52 is equipped with a circumferential groove 51 into which a likewise circumferential seal, preferably an O-ring, can be inserted. With the closure piece inserted, this seal bears against the inner wall of the pipe section 40 in a sealing manner. The bottom 53 is provided with a receptacle in the center, it being possible for a threaded piece 54 to be fixed in said receptacle in a sealed-off manner. The threaded piece 54 can be screw-connected to a tensioning element 60 which is preferably in the form of a tie rod. In the present case, the tensioning element 60 is in the form of a threaded rod. As shown in FIG. 5, central passages 28 of the holders 20, which passages are aligned with one another, pass through the tensioning element 60. The tensioning element 60 is connected to the cover 70 at that end which is averted from the closure piece 50. The cover 70 again has a bottom 78 which has a plug attachment integrally formed on it. The outer contour of the plug attachment 71 is designed to match the inner contour of the pipe section 40. The plug attachment 71 is again provided with a groove 72 into which a circumferential seal can be inserted. The seal 72 bears against the inner wall of the pipe section 40 in a sealing manner. As further shown in FIG. 5, the plug attachment 71 surrounds a receiving space 77. A control circuit 76 is accommodated in this receiving space 77. This control circuit 76 serves to control the combination of rechargeable battery cells Z. The plug attachment 71 is connected to a holding piece 79 on that side which is averted from the bottom 78. Advantageously, the holding piece 79 is melded to the plug attachment 71. The holding piece 79 forms a threaded receptacle 79 in the center, the tensioning element 60 being screwed into said threaded receptacle. The closure piece 50 and the cover 70 can therefore be clamped to one another by tightening the threaded piece 54. In this case, the tensioning force is transmitted by means of the tensioning element 60. When the threaded piece 54 is tightened, both the closure piece 50 and the cover 70 are continuously drawn into the pipe section 40 by way of their plug attachments 52 and 71. In this case, the insertion movement is limited by means of stops which are formed in the transition region between the plug attachments 52, 71 and the bottoms 53, 78. In the assembled state, the plug attachment 52 of the closure piece 50 rests on the associated rechargeable battery cell Z at the end. On the opposite side, the holding piece 79 of the cover 70 prevents the longitudinal displacement of the associated rechargeable battery cell Z. In this way, the row of rechargeable battery cells is accommodated in the pipe section 40 in a secure manner. The two end poles of the right-hand side rechargeable battery cells Z, which are formed by the pole connectors 30, are coupled to pole connections 73 and 74 by means of electrical conducting elements. Therefore, contact can be made with the outside of the rechargeable battery unit which is illustrated in FIG. 5. The rechargeable battery unit further has a diagnosis connection 75 which is connected to the control circuit 76. The rechargeable battery unit can preferably be connected to an evaluation circuit by means of a bus system via the diagnosis connection 75, so that continuous monitoring of the operating state is possible.

The holders 20 are in the form of plastic parts for the purpose of providing electrical insulation. In the present exemplary embodiment, the holders 20 are designed as plastic injection-molded parts. As shown in FIG. 1, said holders have lateral tensioning elements 26 which, when the rechargeable battery cells Z are inserted into the pipe section 40, bear against the inner wall of the pipe section 40 with a tensioning action and in this way provide lateral play-free positioning.

The individual rechargeable battery cells Z of a row of rechargeable battery cells are electrically contact-connected to one another by means of suitable connecting elements. In this case, the adjacent contacts, which are positioned laterally in the contact receptacles 27 of the holders 20, of the rechargeable battery cells which are lined up with one another are electrically connected to one another. By way of example, cable connections can be provided here. Contact can advantageously be made with rigid electrically conductive connectors, for example metal sheets, which are welded to the contacts 33, by way of the contacts 33. The rechargeable battery cells Z are fixed in the longitudinal direction in this way.

The invention claimed is:

1. A rechargeable battery unit for a watercraft, the rechargeable battery unit comprising:
   a holding arrangement including two holders, each holder having a plurality of receptacles;
   a plurality of rechargeable batteries connected to one another by the holding arrangement to form a rechargeable battery cell, each of the rechargeable batteries having two poles;
   at least one pole connector electrically coupling at least some of the rechargeable batteries to one another;
   wherein two or more rechargeable battery cells are lined up with one another and electrically coupled to one another; and wherein the two holders of the holding arrangement of each rechargeable battery cell are separated by a clearance distance, each holder receiving a respective one of the two poles of each rechargeable battery.

2. The rechargeable battery unit of claim 1, wherein:
the plurality of rechargeable batteries of each rechargeable battery cell includes at least two groups of rechargeable batteries, said groups each being electrically connected to one another in parallel by the at least one pole connector.

3. The rechargeable battery unit of claim 1, wherein:
the rechargeable batteries each include a cylindrical housing having two ends; and
the receptacles include plug receptacles, each plug receptacle receiving a respective end of the cylindrical housing of one of the rechargeable batteries.

4. The rechargeable battery unit of claim 1, wherein:
each holder includes passages configured to provide access to the poles of the rechargeable batteries.

5. The rechargeable battery unit of claim 1, wherein:
each holder includes alignment elements such that corresponding holders of two different rechargeable battery cells are aligned in relation to one another when the corresponding holders of respective rechargeable battery cells are situated against each other.

6. The rechargeable battery unit of claim 5, wherein:
the corresponding holders of the two different rechargeable battery cells are secured in relation to one another in one direction in an interlocking manner.

7. The rechargeable battery unit of claim 1, wherein:
the at least one pole connector includes contacts routed out from between two respective rechargeable battery cells that are lined up with one another.

8. The rechargeable battery unit of claim 1, wherein:
the plurality of rechargeable batteries of each rechargeable battery cell includes at least two groups of rechargeable batteries; and
each group of rechargeable batteries of one rechargeable battery cell is connected electrically in series with a corresponding group of rechargeable batteries of another lined-up rechargeable battery cell.

9. The rechargeable battery unit of claim 1, wherein:
poles of at least some of the rechargeable batteries are aligned in a single connection plane.

10. The rechargeable battery unit of claim 1, further comprising:
a pipe section having two ends and an interior passage extending between the two ends;
a closure piece closing the interior passage of the pipe section at one of the two ends;
a cover closing the interior passage of the pipe section at another of the two ends; and
wherein the two or more rechargeable battery cells are lined up with one another in the interior passage of the pipe section.

11. The rechargeable battery unit of claim 10, wherein:
the closure piece and the cover are connected to one another by a tensioning element extending through the interior passage of the pipe section.

12. The rechargeable battery unit of claim 10, wherein:
the cover includes two pole connections accessible from outside the interior passage of the pipe, and
the two or more rechargeable battery cells form a positive pole and a negative pole, said positive pole and said negative pole being electrically connected to the pole connections.

13. The rechargeable battery unit of claim 10, further comprising:
a receiving space defined in the cover; and
a control circuit for the rechargeable battery cells arranged in the receiving space.

14. The rechargeable battery unit of claim 1, wherein:
each holder includes recesses configured to provide access to the poles of the rechargeable batteries.

* * * * *